ANALOG TO BINARY SIGNAL PROCESSOR

Filed Sept. 15, 1966 2 Sheets-Sheet 1

INVENTOR.
ROY G. SALAMAN
BY
Russell, Chittick & Pfund

March 10, 1970 R. G. SALAMAN 3,500,073

ANALOG TO BINARY SIGNAL PROCESSOR

Filed Sept. 15, 1966 2 Sheets-Sheet 2

INVENTOR.
ROY G. SALAMAN
BY
Russell, Chittick & Pfund

United States Patent Office 3,500,073
Patented Mar. 10, 1970

3,500,073
ANALOG TO BINARY SIGNAL PROCESSOR

Roy G. Salaman, Boulder, Colo., assignor, by mesne assignments, to Phonocopy, Inc., Wilmington, Del., a corporation of Delaware Filed Sept. 15, 1966, Ser. No. 579,590
Int. Cl. H03k 5/00
U.S. Cl. 307—268 2 Claims

ABSTRACT OF THE DISCLOSURE

An analog to binary processor for input signals having transitions representing change of state information signals superposed on a fluctuating baseline has a high frequency and low frequency responsive circuit with the output of the processor being controlled by the low frequency circuit in conjunction with the high frequency circuit. Each circuit has a voltage comparator and the low frequency circuit is also provided with a detector and gate circuit to yield an output voltage approximately centered between the input signal peak-to-peak amplitude, which centered signal is applied together with the original input signal to the low frequency voltage comparator to produce a binary control waveform. The control waveform is combined with the original input signal to form one input for the high frequency voltage comparator, while the other input of the later comparator is a time delayed version of the original input signal, whereby the output of the high frequency comparator is a binary signal representing both large and small transitions in the original input signal.

Figure 1:
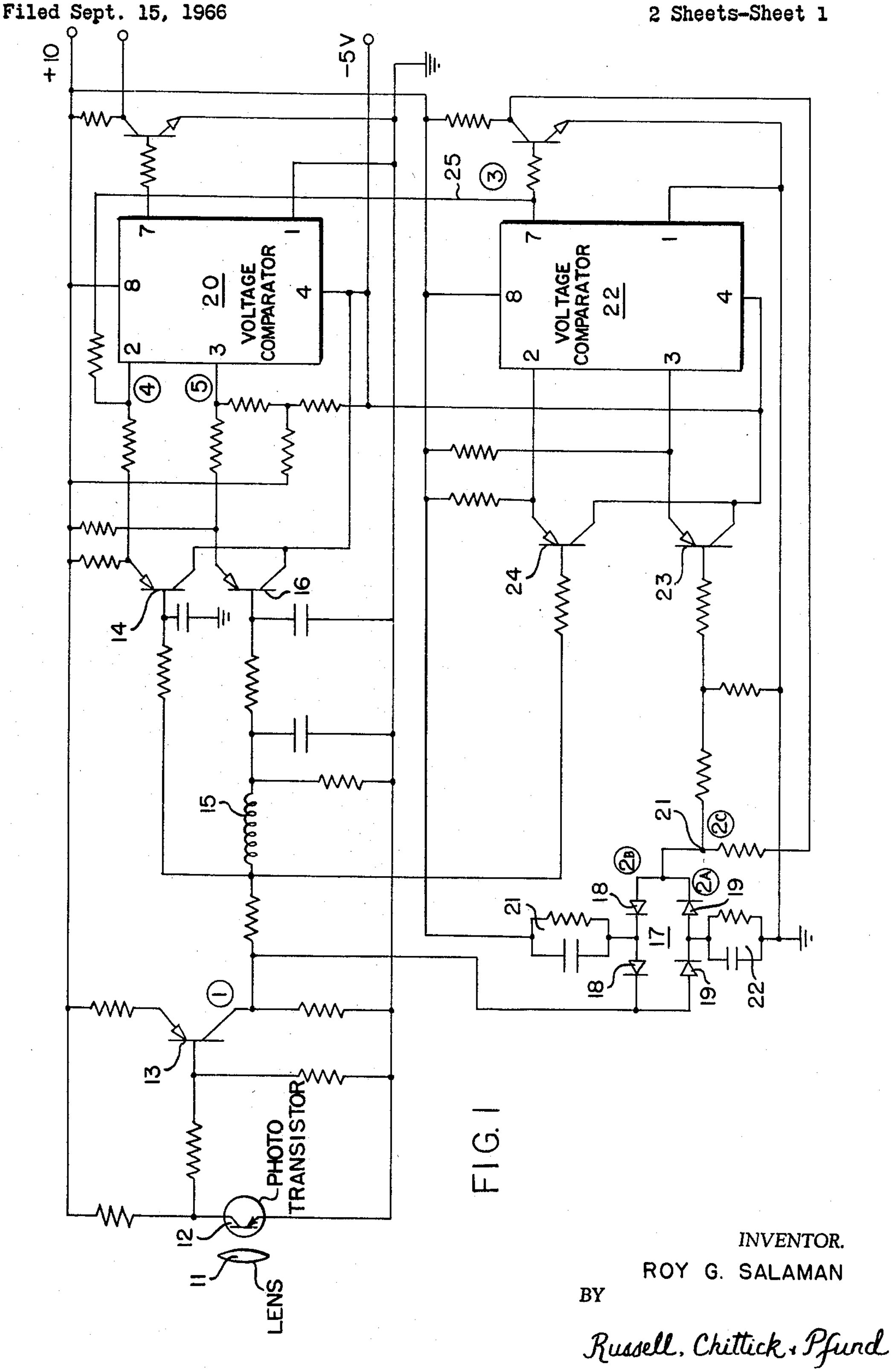

This invention relates to circuits for converting undulating signals containing binary information into a pure biary waveform and is particularly useful in connection with binary type signals which are superposed on a fluctuating base line.

Various circuits are known in the prior art for sampling a waveform to derive the binary information content therein including arrangements for comparing the peaks of such waveforms with the average value thereof for the intended purpose of obtaining a square wave binary signal. These circuits while useful have a limited ability to detect small amplitude fluctuations representing information transitions from one to the other binary state which occur in the presence a relatively large transition that may be associated with both an information change and a background change which is sustained over the time duration of the subsequent information transitions. For signals of this type the usual averaging or filtering circuits are liable to be unresponsive to a significant portion of the information transitions.

The present invention provides an improvement in the extraction of pure binary signals from a fluctuating base line signal by, in effect, providing a high frequency and low frequency responsive circuit with the low frequency circuit controlling the output waveform in conjunction with the high frequency responsive circuit so that a sensitivity to both large and small transitions is achieved. The principal object of the present invention, accordingly, is the achievement of an improved signal processing to extract binary information in accordance with the foregoing principles.

Figure 2:
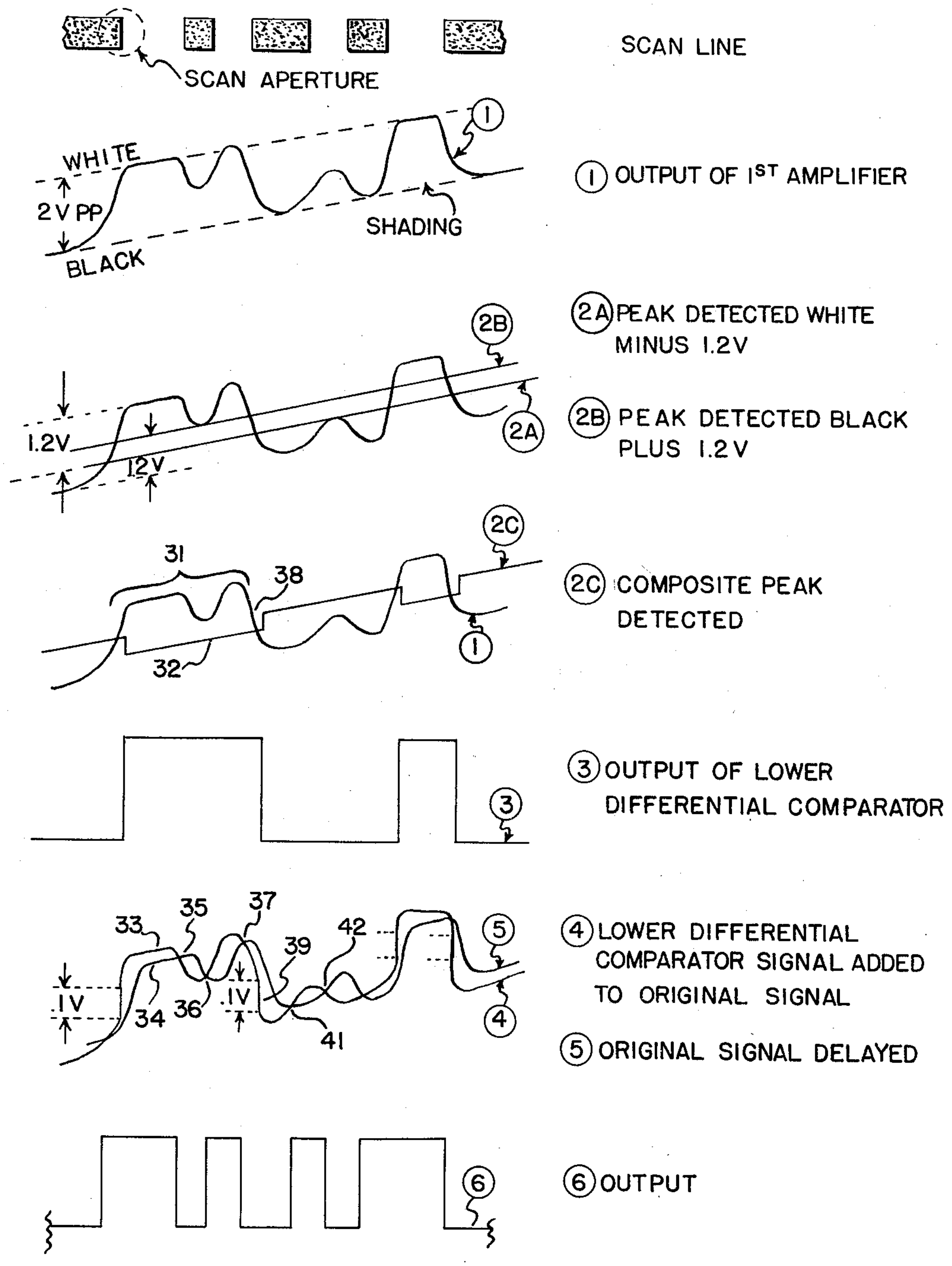

Referring now to the drawings:

FIG. 1 is a schematic circuit diagram of a processor in accordance with the invention; and FIG. 2 is a waveform diagram useful in describing the operation of the circuit in FIG. 1.

Referring now to FIG. 1 the invention will be described with particular reference to facsimile type signals which are derived by a line scan process of black on white copy that is to be transmitted by a binary facsimile system. The circuit of the present invention is particularly useful with the binary facsimile system disclosed and claimed in the application of Salaman and Picchiottino Ser. No. 579,591, filed Sept. 15, 1966, entitled "Binary Facsimile System." In the operation of the line scanning process of such systems the letters or other indicia which are scanned are focused by means of a lens 11 upon a photo-transistor 12 to produce a signal which is characterized by the changes between black and white in the copy that is scanned superposed upon variations in the reflectivity and focus of the scanning equipment and various other parameter variations which provide a fluctuating base line for the actual transitions which represent the binary information that is to be transmitted. The signals from the photo-transistor 12 are inverted by transition stage 13 and appear as waveform 1 on the collector of transistor 13. This signal is applied to the base of an emitter follower 14 and with predetermined time delay through the network 15 to the base of an emitter follower 16. The signals from the emitter followers 14 and 16 are applied to a first voltage comparator 20 as hereinafter described.

The waveform 1 from the collector of transistor 13 is applied to a detector and gate circuit 17. The circuit 17 comprises two series connected diodes 18 poled to pass negative portions of the waveform 1 and two series connected diodes 19 poled to pass positive portions of the waveform 1. The first diode in each circuit 17 has associated therewith a RC filter circuit 21, 22 with the filter 21 referenced to the positive voltage supply and the filter 22 referenced to ground or zero volts. The second diode acts as a gate which opens when its resistive return is appropriately biased. The gate diodes 18 and 19 are joined at a terminal 21 with a bias derived from a second voltage comparator circuit 22 also applied to point 21. The bias waveform from comparator 22 applied to terminal 21 is a rectangular wave (waveform 3 inverted) which, then positive, forward biases gate diode 18 and back biases gate diode 19; when negative, gate diode 18 is back biased and gate diode 19 is forward biased. The voltage at terminal 21 is applied to the base of an emitter follower 23 which provides one input to a second voltage comparator 22. The other input to the comparator 22 is derived from emitter follower 24 which has applied to its base the undelayed input signal waveform 1. The output of the comparator 22 is applied on line 25 for combination with the output of emitter follower 14 to produce waveform 4. This waveform is one input to the first voltage comparator 20 and the second input to the comparator 20 is the delayed input waveform derived from the emitter follower 16 designated waveform 5.

The voltage comparators 20 and 22 may be commercial types Fairchild 710 C with the numbered leads 1, 2, 3, 4, 7 and 8 connected as indicated.

The operation of the circuit of FIG. 1 will be described with reference to the waveforms of FIG. 2 which show somewhat exaggerated increments of amplitude and time to facilitate the explanation. Upon scanning a line containing black and white elements as indicated by the SCAN LINE in FIG. 2 the photo-transistor 12 will develop an output similar to waveform 1 as it appears after inversion in the transistor 13. Note that the scan aperture produces an unavoidable gradual voltage change in the waveform rather than an abrupt transition. In waveform 1 the sloping base line is indicated which can be caused, for example, by a variation in shading on the original copy scanned or from any other undesirable effect.

Waveform 1 applied to the detector and gate circuit 17 makes the diodes 18 conductive on the negative peaks of the signal and makes the diodes 19 conductive on the positive peaks. When the resistive return of the gate diodes 18 and 19 is grounded, the gate diode 19 is conductive and the voltage 2A from filter 22 appears at terminal 21. For the opposite bias condition gate diode 18 is conductive and voltage 2B appears at terminal 21. In each case the contact potential of the two series diodes adds approximately 1.2 volts to the DC potential which is detected with a polarity opposite that of the detected voltage in each case. Thus the waveform 2A will be less than the center of a 2 v. peak-to-peak original waveform, as indicated, and waveform 2B will be greater than the center of a 2 v. peak-to-peak original waveform. This condition is assured by virtue of the two volt peak-to-peak amplitude of waveform 1 and the opposite polarity 1.2 volt contact potential provided by the two diodes in series in circuit 17. Thus the composite waveform 2C appearing at terminal 21 is made up of the selected portions of the waveform 2A or 2B depending on whether the instantaneous input signal is above or below the middle of the waveform 1. This determination is made in voltage comparator 22 by comparing the actual input waveform 1 with the combined waveform at terminal 21 so that the output waveform 3 changes state whenever the original waveform 1 moves to the opposite side of the then existing waveform at terminal 21. This circuit thus effectively utilizes the output of the comparator 22 to switch the detector 17 to one or the other polarity depending upon the relation of the input waveform 1 to the existing detected level including the bias increment introduced due to the contact potential of the diode pair that is then conducting.

The output of the differential comparator 22 (waveform 3) is combined with the undelayed input signal to produce the waveform 4 which consists of a 0.1 volt increment combined with the magnitude of the waveform 1. The polarity of the increment is determined by whether the input waveform 1 is above or below the averaged value which is being selected from the detector 17 as already described for waveform 3. Take, for example, the condition that exists after the first transition from black to white in the SCAN LINE. In FIG. 2 it can be seen that the portion of the waveform 2C labeled 31 is above the average waveform portion 32 that is being used. For this condition waveform 4 at the same time point indicated at 33 is above the delayed waveform 5 at the corresponding time point 34. Thus the output of the differential comparator 20 produces a white signal which corresponds with the information content from the SCAN LINE. The next transition from white to black is indicated in waveform 1 as being a small amplitude change and hence one that does not alter the average value an amount sufficient to switch the comparator 22. As indicated in waveforms 4 and 5, however, the waveform 4 crosses to be lower than waveform 5 at the intersection 35 thereby producing a white to black transition in the output waveform 6. A similar small amplitude transition from black to white occurs at the point 36. For the next large amplitude transition of waveform 1, indicated at 37, the amplitude change exceeds in magnitude and speed the detected response level of the filter 21 thereby causing the waveform 1 to drop below the level of waveform 2C which switches the comparator 22 at the point 38. This 0.1 volt increment from waveform 3 produces the vertical drop indicated at 39 in the waveform 4 thereby placing waveform 4 a substantial distance from waveform 5 so that variations such as the next transition at point 41 can be recorded as black to white transitions and vice versa as at 42 while not making the waves 4, 5 so close that random noise produces spurious binary transition signals in the output waveform 6.

Modifications of the present invention will now be apparent to those skilled in the art without departing from the principles herein described. The invention is to be considered as including such modifications as come within the scope of the appended claims.

In the claims:

1. An analog to binary converter for input signals having transitions representing change of state of binary information superposed on a non-constant baseline comprising:

(a) a first voltage comparator;
(b) a second voltage comparator;
(c) a detector and gate circuit including positive and negative bias voltage means for adding a positive fixed voltage increment to the negative detected level and a negative fixed voltage increment to the positive detected voltage level to produce an output having a voltage approximately centered between the positive and negative peaks of the input signal;
(d) means applying the said output of said detector including said increments under control of the ouptut of said second voltage comparator to obtain a control waveform which differs from the peak-to-peak center value of the input wave in accordance with the magnitude and polarity of said increments;
(e) means coupling said input signal with predetermined time delay as one input to said first voltage comparator;
(f) means coupling said input signal as one input to said second voltage comparator;
(g) means coupling said control waveform as the other input to said second voltage comparator;
(h) means for combining the output of said second voltage comparator with the undelayed input signal to form a combined signal as the other input to said first voltage comparator, said combined signal adding positive and negative increments to said undelayed input signal in accordance with the switching of said second voltage comparator; and
(i) means for coupling a binary output signal from said first voltage comparator without baseline variation.

2. An analog to binary converter for input signals having transitions representing change of state of binary information superposed on a non-constant baseline comprising:

(a) a first voltage comparing means for comparing the amplitude of said input signal with a delayed replica of said input signal;
(b) a second voltage comparing means for comparing the amplitude of said input signal with a modified center value of said input signal;
(c) means connected to one of the input terminals of said second voltage comparing means for modifying the peak-to-peak amplitude center value of said input signal by a predetermined voltage increment of polarity to increase the voltage difference between said modified center value and the peak values of said input signal; and
(d) means connected to one of the input terminals of said first voltage comparing means for modifying the voltage amplitude of one of the input signals to said first voltage comparing means by a predetermined voltage increment of polarity determined by said second voltage comparing means to thereby separate said delayed and undelayed input signals by an amount which prevents small amplitude noise voltages from causing spurious transition outputs from said first voltage comparing means.

References Cited

UNITED STATES PATENTS

| | | | |
|---|---|---|---|
| 2,446,613 | 8/1948 | Shapiro | 328—117 XR |
| 3,076,145 | 1/1963 | Copeland et al. | 328—165 |
| 3,293,553 | 12/1966 | Brown | 328—146 XR |
| 3,327,230 | 6/1967 | Konian | 328—164 |

JOHN S. HEYMAN, Primary Examiner

JOHN ZAZWORSKY, Assistant Examiner

U.S. Cl. X.R.

307—235, 264; 328—117, 162